United States Patent

[11] 3,615,220

| [72] | Inventor | Robert F. Burke |
|---|---|---|
| | | Riverdale, N.J. |
| [21] | Appl. No. | 812,134 |
| [22] | Filed | Apr. 1, 1969 |
| [45] | Patented | Oct. 26, 1971 |
| [73] | Assignee | The Lummus Company |
| | | Bloomfield, N.J. |

[54] PROCESS FOR RECOVERING SULFUR VALUES FROM PYRITES BY SMELTING
4 Claims, 1 Drawing Fig.

| [52] | U.S. Cl. | 23/224, 23/226 |
|---|---|---|
| [51] | Int. Cl. | C01b 17/06 |
| [50] | Field of Search | 23/181, 224–226 |

[56] References Cited

UNITED STATES PATENTS

| 587,068 | 7/1897 | Stickney | 23/224 |
|---|---|---|---|
| 1,083,247 | 12/1913 | Hall | 23/181 |
| 1,751,067 | 3/1930 | Benner et al. | 23/224 |
| 1,917,687 | 7/1933 | Bacon et al. | 23/226 |
| 2,040,682 | 5/1936 | Bacon et al. | 23/226 |

FOREIGN PATENTS

| 223,904 | 11/1957 | Australia | 23/225 |
|---|---|---|---|

*Primary Examiner*—Oscar R. Vertiz
*Assistant Examiner*—G. O. Peters
*Attorney*—Marn & Jangarathis

ABSTRACT: A process for recovering sulfur values from pyrites smelting effected under nonoxidizing conditions using a carbon fuel wherein a hydrogen-containing gas, such as steam or hydrogen, is admixed with the off-gas, the mixture cooled to a temperature between 300° and 450° C. and contacted with a Claus reaction catalyst to generate hydrogen sulfide by reaction between the reducing gases of the off-gas, sulfur and the hydrogen-containing gas. The sulfur dioxide in the off-gas is then reacted with the hydrogen sulfide via the Claus reaction to produce elemental sulfur.

PATENTED OCT 26 1971
3,615,220
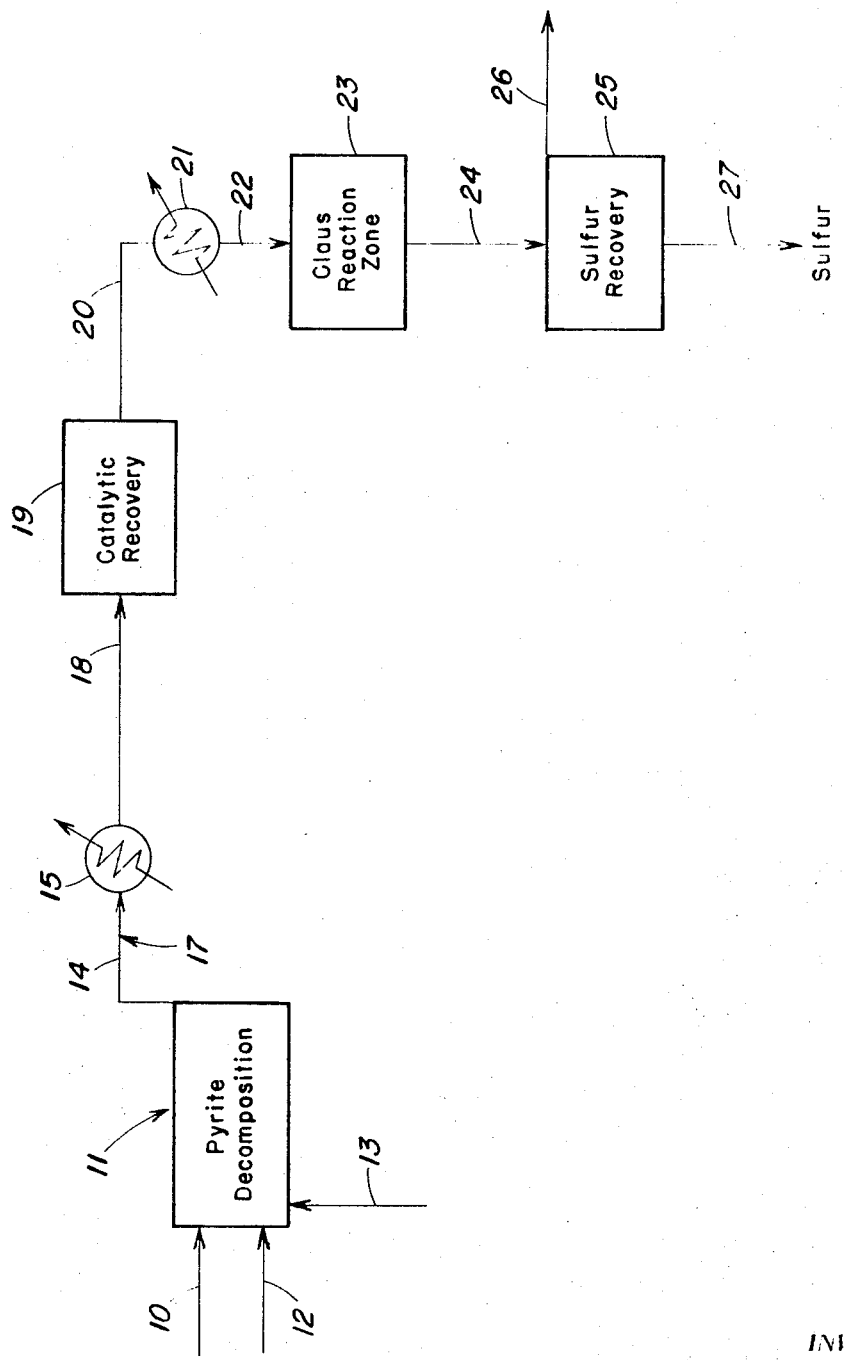
INVENTOR.
Robert F. Burke
BY
Marn & Jangarathis
ATTORNEYS

PROCESS FOR RECOVERING SULFUR VALUES FROM PYRITES BY SMELTING

BACKGROUND OF THE INVENTION

1. Field of the Invention

The present invention relates generally to extractive metallurgy and more particularly, to the treatment of pyritic minerals for the recovery of sulfur values.

The mineral pyrite is generally characterized as $FeS_2$, though the stoichiometry is not exact. The pyrite may be treated to recover iron and nonferrous values.

2. Prior Art

In U.S. Pat. No. 3,306,708 to Bryk et al., there is disclosed a process for treating pyrite wherein finely divided pyrite is intermixed with a combustion gas produced by burning fuel in a suitable burner. The temperature of the combustion gases is sufficient to release the labile sulfur from the pyrite and the iron sulfide (FeS) is recovered as a liquid. The resulting gases, containing sulfur, and some sulfur dioxide and hydrogen sulfide, are then treated to remove elemental sulfur therefrom and the sulfur free gas subjected to a Claus reaction whereby hydrogen sulfide and sulfur dioxide react to produce further elemental sulfur which is recovered as product.

SUMMARY OF THE INVENTION

The present invention is directed to the smelting of pyrites wherein fuel requirements for such smelting is supplied either by the carbon content of the pyrites or by the addition of carbon in the form of powdered coal. In the smelting of pyrites, by the use of carbon as a fuel, the hydrogen sulfide produced during such smelting is insufficient to react with the sulfur dioxide contained in the off-gas to produce elemental sulfur by the Claus reaction. Moreover, there is insufficient hydrogen available for effecting the generation of additional hydrogen sulfide for reaction with the sulfur dioxide of the off-gas.

An object of this invention is to provide a process for recovering sulfur values from the smelting of pyrites.

Another object of this invention is to provide an improved process for recovering sulfur values form the smelting of pyrites in a nonoxidizing atmosphere employing a carbon fuel.

The above objects and numerous other objects should be readily apparent from the reading of the following description of the invention.

The objects of this invention are broadly accomplished by adding a hydrogen-containing gas to the off-gas from the smelting of pyrites in a nonoxidizing atmosphere, cooling the mixture to a temperature from about 450° to about 300° C. and contacting the gas with a Claus reaction catalyst. The off-gas from the smelting contains the reducing gas carbon monoxide and possibly some carbon oxysulfide and as a result of contacting the off-gas, now containing a hydrogen-containing gas, with the Claus reaction catalyst, the reducing gas(es), sulfur and hydrogen-containing gas react to generate hydrogen sulfide. The generated hydrogen sulfide is then reacted with the sulfur dioxide of the off-gas, via the Claus reaction, to produce elemental sulfur which is recovered as product.

BRIEF DESCRIPTION OF THE DRAWING

The accompanying drawing is a greatly simplified flow diagram illustrating an embodiment of the invention.

DETAILED DESCRIPTION OF THE INVENTION

Referring now to the drawing, finally divided pyrite or pyrite concentrate in line 10 is introduced into a pyrite decomposition zone, schematically indicated as 11, along with a controlled amount of air introduced through line 12 to maintain nonoxidizing conditions within the pyrite decomposition zone. In accordance with the procedure of this invention, the carbon content of the pyrite is generally sufficient to supply the fuel requirements for such decomposition and in the event such carbon is not sufficient, additional carbon, for example in the form of powdered coal, may be introduced into the decomposition unit through line 13. The amount of oxygen and carbon introduced into the decomposition reactor is controlled so as to produce a nonoxidizing atmosphere and a temperature of at least about 1,200° C. to maintain the ferrous sulfide matte in molten form.

The decomposition zone 11 may be any of a wide variety of smelting furnaces generally known in the art and, for example, may be one such as is disclosed in the U.S. Pat. No. 3,306,708, in which case the pyrite and oxygen are introduced to suitable burners in order to provide the combustion gas for effecting smelting. It is to be understood however, as hereinabove noted, that the quantity of oxygen introduced is insufficient to effect oxidation of the pyrite and consequently, a nonoxidizing atmosphere is maintained within the smelter 11. The conditions for effecting smelting may be identical to those disclosed in U.S. Pat. No. 3,306,708, except that the fuel requirements are provided either by the carbon content of pyrite or by the addition of carbon as powdered coal through suitable carbon burners.

As a result of effecting smelting in smelting furnace 11 in a nonoxidizing atmosphere with a carbon fuel, the off-gas withdrawn therefrom through line 14 does not contain sufficient hydrogen sulfide to provide the stoichiometric proportions of hydrogen sulfide required to react with sulfur dioxide therein via the Claus reaction; i.e., the stoichiometric proportion of $H_2S$ to $SO_2$ is significantly less than 2 to 1. Moreover, as a result of employing a carbon fuel, the hydrogen content of the gas is insufficient to generate sufficient additional hydrogen sulfide for reaction with the sulfur dioxide in the off-gas. The off-gas generally contains the composition ranges defined in the table below:

TABLE

| Gas | Volume % (ranges) |
| --- | --- |
| $N_2$ | 70–72 |
| $SO_2$ | 3–5 |
| $H_2S$ | 0–1 |
| COS | 0—0.5 |
| CO | 3–5 |
| $H_2$ | 0–0.5 |
| $CO_2$ | 11–14 |
| $H_2O$ | 0–2 |
| $S_2$ | 3–5 |

In accordance with the invention, the off-gas in line 14 is admixed with a hydrogen-containing gas in line 17, which may contain either elemental hydrogen and/or steam, with steam being preferred as a result of lower cost. The hydrogen-containing gas is introduced in an amount sufficient to provide the off-gas with the requisite quantity of hydrogen values, for production of hydrogen sulfide in the quantity required for reaction with essentially all of the sulfur dioxide of the off-gas via the Claus reaction, as hereinafter more fully described.

The off-gas, now containing steam or hydrogen, is passed through a waste heat boiler, schematically indicated as 15 wherein the temperature of the gas is reduced to from about 450° to about 350° C. As a result of the cooling in waste heat boiler 15, the equilibrium of the gas shifts towards the formation of the reducing gas carbon oxysulfide, as represented by the following equation:

$$2CO + S_2 \rightarrow 2COS$$

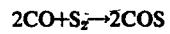

The off-gas, at the hereinabove noted temperature, is introduced into a catalytic converter, schematically indicated as 19, containing a suitable Claus reaction catalyst, such as alumina or bauxite. In the converter 19, the hydrogen and/or steam react with the reducing gases, carbon monoxide and carbon oxysulfide, to produce hydrogen sulfide, as represented by the following equations:

$$H_2 + CO \rightleftharpoons H_2 + CO_2$$
$$H_2O + COS \rightleftharpoons H_2 + CO_2 + S$$
$$H_2 + COS \rightleftharpoons H_2 + CO_2 + S$$
$$H_2 + COS \rightleftharpoons H_2S + CO_2$$

A gaseous effluent, now containing hydrogen sulfide in a quantity sufficient to react with the sulfur dioxide in the off-gas, is withdrawn from high-temperature converter 19 through line 20, passed through cooler 21 wherein the temperature of the gas is reduced to a reaction temperature generally employed for producing elemental sulfur from hydrogen sulfide and sulfur dioxide via the Claus reaction; e.g., a temperature from about 250° to about 200° C. The cooled gas withdrawn from cooler 21 in line 22 is introduced into a Claus reaction zone 23, containing a suitable catalyst, such as bauxite or alumina, to produce elemental sulfur, as represented by the following equation:

$2H_2S + SO_2 \rightleftharpoons S_2 + 2H_2O$ The Claus reaction is generally known in the art and therefore no detailed description thereof is necessary for complete understanding of the invention.

A gaseous effluent is withdrawn from the Claus reaction zone 23 through line 24 and introduced into a sulfur recovery zone 25 for removing sulfur therefrom. The sulfur recovery zone 25 may contain any of a wide variety of known equipment for removing sulfur from a gas; e.g., an electrostatic precipitator or the like. A sulfur free effluent is withdrawn from the sulfur recovery zone 25 through line 26 and in general this effluent contains less than 0.5 percent sulfur dioxide, less than 0.5 percent hydrogen sulfide and less than 0.1 percent carbon oxysulfide. The sulfur is withdrawn from zone 25 through line 27.

The invention is further illustrated by the following example which illustrates conditions under which the process of the invention may be practiced, but it is to be understood that the scope of the invention is not to be limited thereby.

EXAMPLE

An off-gas (76,000 SCFM) having the following composition is withdrawn from pyrite decomposition zone 11 at a temperature of 1,200° C.

COMPOSITION

| Gas | Volume % |
|---|---|
| $CO_2$ | 11.0 |
| $H_2O$ | 0 |
| $SO_2$ | 2.98 |
| $H_2S$ | 0 |
| COS | 0.25 |
| CO | 5.62 |
| $H_2$ | 0 |
| $S_2$ | 4.50 |
| $N_2$ | 75.63 |

The off-gas is mixed with 250 lbs./min. of steam in line 17, at a temperature of 300° F. and pressure of 90 p.s.i.g. and cooled to a temperature of 400° C. in waste heat boiler 15. The gaseous mixture in line 18 has the following composition:

COMPOSITION

| Gas | Volume % |
|---|---|
| $CO_2$ | 10.3 |
| $H_2O$ | 6.3 |
| $SO_2$ | 2.8 |
| $H_2S$ | 0.2 |
| COS | 3.8 |
| CO | 1.8 |
| $H_2$ | 0.2 |
| $S_2$ | 1.5 |
| $N_2$ | 73.1 |

The gaseous mixture is introduced into the catalytic converter 19, containing a bauxite catalyst and the effluent withdrawn therefrom in line 20 has the following composition:

COMPOSITION

| Gas | Volume % |
|---|---|
| $CO_2$ | 15.6 |
| $H_2O$ | 1.0 |
| $SO_2$ | 2.8 |
| $H_2S$ | 5.6 |
| COS | 0.2 |
| CO | 0.1 |
| $H_2$ | 0.1 |
| $S_2$ | 0.6 |
| $N_2$ | 75.0 |

The gaseous effluent in line 20 is cooled to a temperature of 200°-250° C. in cooler 21 and introduced into the Claus reaction zone 23, containing a bauxite catalyst. The gaseous effluent which is withdrawn from the Claus reaction zone 23 at a rate of 80,700 SCFM in line 24 has the following composition:

COMPOSITION

| Gas | Volume % |
|---|---|
| CO | 0.1 |
| COS | 0.2 |
| $SO_2$ | 0.2 |
| $H_2S$ | 0.4 |
| $CO_2$ | 15.6 |
| $H_2O$ | 5.2 |
| $H_2$ | 0.1 |
| $S_2$ | 4.5 |
| $N_2$ | 73.7 |

The gas is introduced into sulfur recovery zone 25 wherein 600 lbs./min. of sulfur is recovered. The sulfur recovery, without the processing features of the invention, would be about 300 lbs./min.

The process of the invention is extremely advantageous in that it enables effective recovery of elemental sulfur from a sulfur dioxide containing effluent which is deficient in hydrogen and hydrogen sulfide. Thus, the off-gas resulting from smelting of pyrites in a nonoxidizing atmosphere employing a carbon fuel, may be effectively treated for recovery of sulfur values as elemental sulfur.

Numerous modifications and variations of the present invention are possible in light of the above teachings and therefore the invention may be practiced in a manner other than as particularly described.

What is claimed is:

1. A process for smelting pyrites and recovering the sulfur values therefrom, comprising:
   a. smelting the pyrites in a smelting zone under nonoxydizing conditions maintained with a solid carbon fuel, said smelting producing an off-gas containing sulfur, sulfur dioxide and a reducing gas selected from the group consisting of carbon monoxide and carbon monoxide and carbon oxysulfide, said off-gas containing an insufficient quantity of hydrogen sulfide to provide stoichiometric proportions for reaction with sulfur dioxide via the Claus reaction;
   b. mixing the off-gas with a hydrogen-containing gas selected from the group consisting of steam, hydrogen and mixtures thereof, in an amount to provide sufficient hydrogen values for generation of hydrogen sulfide in the amount required to react with essentially all of the sulfur dioxide of the off-gas via the Claus reaction;

c. contacting the off-gas from step (b) in a first reaction zone maintained at a temperature from about 300° C. to about 450° C. with a Claus reaction catalyst to produce hydrogen sulfide from the added hydrogen-containing gas and the reducing gas and elemental sulfur of the off-gas;
d. introducing the gas from step (c) into a second reaction zone wherein the hydrogen sulfide reacts with the sulfur dioxide via the Claus reaction to produce elemental sulfur; and
e. recovering elemental sulfur.

2. The process as defined in claim 1 wherein the hydrogen-containing gas is steam.

3. The process as defined in claim 2 wherein the Claus reaction is effected in the second reaction zone in the presence of a Claus reaction catalyst at a temperature from about 200° C. to about 250° C.

4. The process as defined in claim 3 wherein the Claus reaction catalyst in the first and second reaction zones is bauxite.